United States Patent [19]

Parsons

[11] 4,046,337
[45] Sept. 6, 1977

[54] HINGED CONTROL SURFACES FOR PRESSURIZED HOT AIR AIRSHIP

[75] Inventor: Roger R. Parsons, Sioux Falls, S. Dak.

[73] Assignee: Raven Industries, Inc., Sioux Falls, S. Dak.

[21] Appl. No.: 651,911

[22] Filed: Jan. 23, 1976

[51] Int. Cl.$^2$ .............................................. B64B 1/02
[52] U.S. Cl. ...................................... 244/96; 244/30; 244/87
[58] Field of Search .................................. 244/25–33, 244/87, 96–98, 125, 126, 119; 52/2; 46/87–89

[56] References Cited

U.S. PATENT DOCUMENTS

| | | | |
|---|---|---|---|
| 1,562,625 | 11/1925 | Fife | 46/87 |
| 1,598,002 | 8/1926 | Parker | 244/97 |
| 1,637,774 | 8/1927 | Hurttle | 244/98 |
| 1,677,308 | 7/1928 | Stokes | 244/98 |
| 1,780,569 | 11/1930 | Schuette | 244/96 |
| 2,698,020 | 12/1954 | Phane | 52/2 |
| 3,457,684 | 7/1969 | Wood | 52/2 |
| 3,547,378 | 12/1970 | Girard | 244/30 |
| 3,871,603 | 3/1975 | Menke et al. | 244/125 |

FOREIGN PATENT DOCUMENTS 837,591  6/1960  United Kingdom ................. 244/5

Primary Examiner—Trygve M. Blix
Assistant Examiner—Galen Barefoot
Attorney, Agent, or Firm—Hill, Gross, Simpson, Van Santen, Steadman, Chiara & Simpson

[57] ABSTRACT

A hot air airship including an elongate aerodynamic shaped gas envelope carrying a pressure hot air generating means for pressurizing the envelope with heated air during flight and having inflatable hollow first tail members at the aft end for stabilizing the flight and second tail members at the aft end of the first tail members hingedly attached thereto with gas conduits extending through the hinges and both tail members inflated by the hot air of the envelope.

5 Claims, 8 Drawing Figures

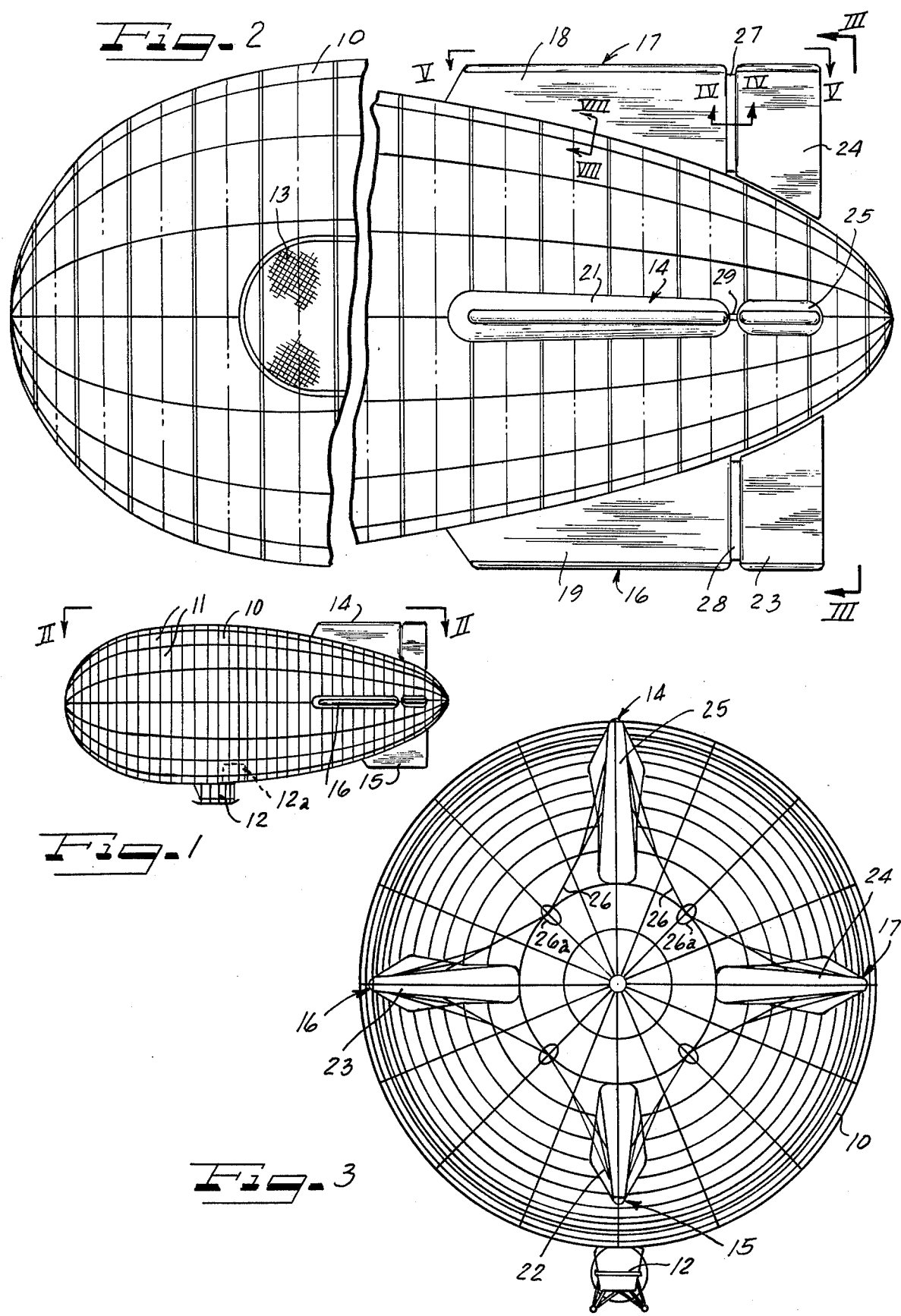

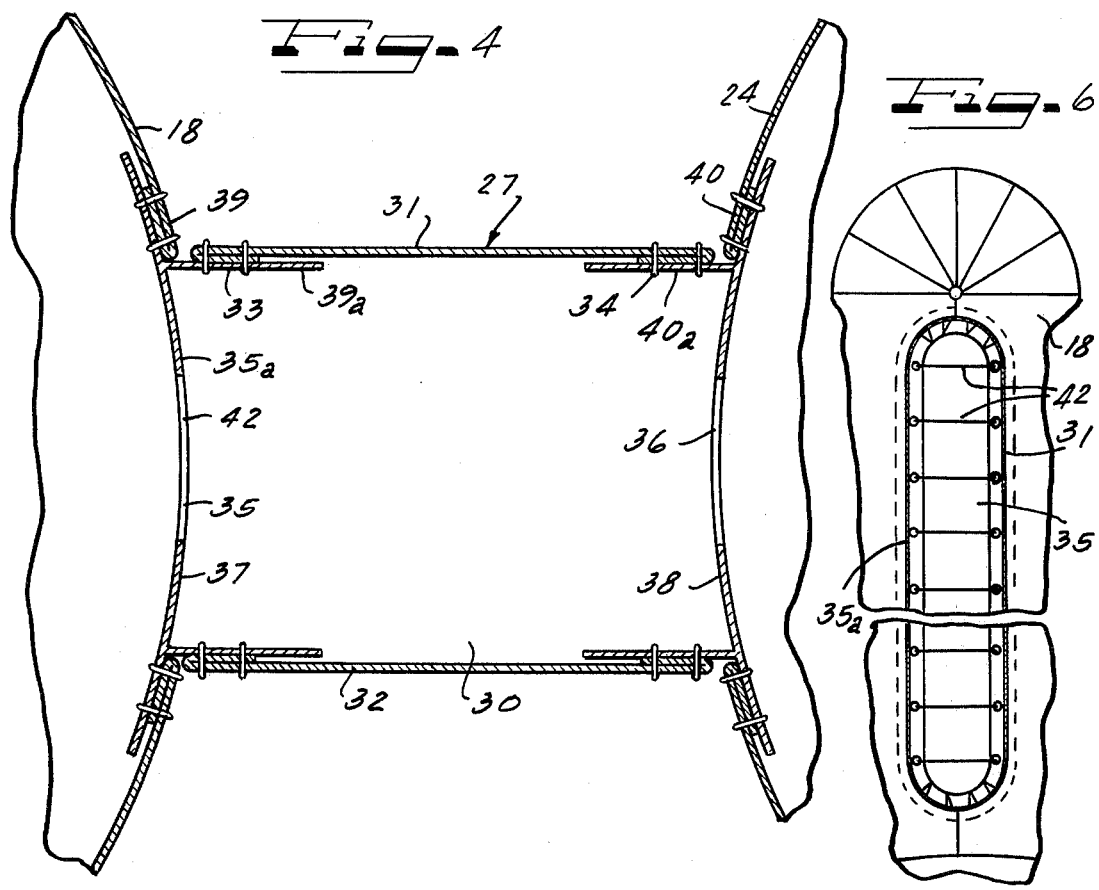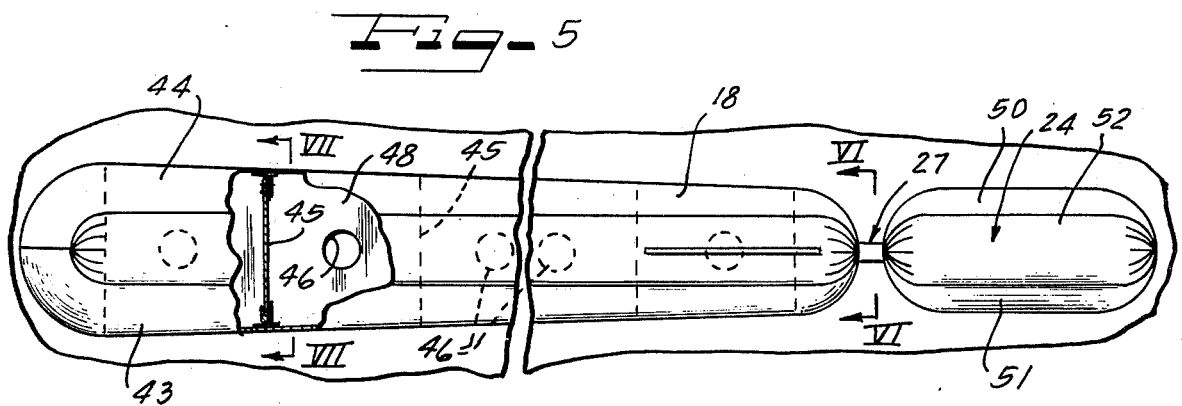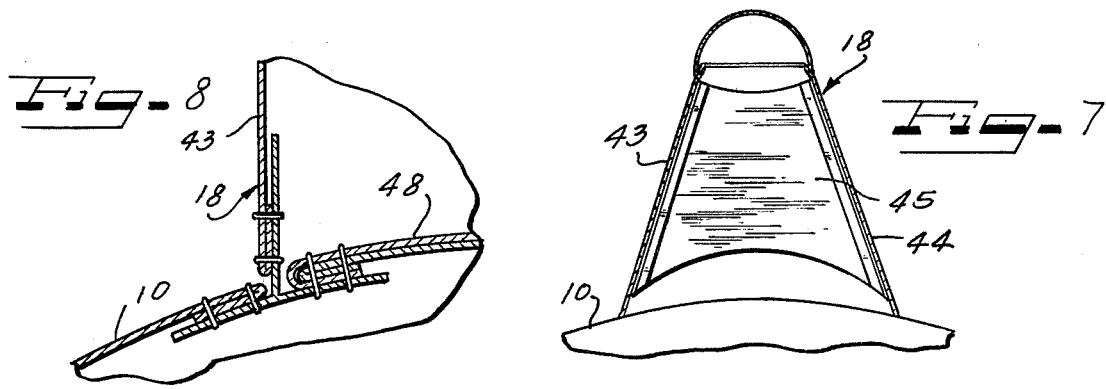

HINGED CONTROL SURFACES FOR PRESSURIZED HOT AIR AIRSHIP

BACKGROUND OF THE INVENTION

The invention relates to improvements in vehicles for traveling through the atmosphere and more particularly to a powered airship inflated by hot air and capable of transporting a payload for distances.

Airships of this type have been referred to as dirigibles and originally referred to as blimps when the airship is nonrigid. The present invention in particular relates to a hot air inflated airship of the nonrigid pressure type. The main envelope or pressure hull is formed of a fabric such as a laminated plastic and nylon, or of suitable other material which is lightweight, extremely strong and resistant to gas diffusion. The envelope of the airship is horizontally elongate and is primarily symmetrical with load lines distributed over the body of the envelope for carrying a payload therebelow. The load lines are also particularly arranged to support hot gas pressure inflation means which preferably will be in the form of one or more propane fueled burners with a fan inflation means. The fan or blower which pressurizes the airship is driven by a suitable motor which may be propane or gasoline fueled.

The plastic fabric envelope when not in use can be folded and shipped or stored in the space which takes up less than 1% of its inflated volume. The envelope can be relatively rapidly inflated by the operation of the fan and the free lift is controllable by control of the burner which controls the temperature of the air within the envelope. The direction of flight is controlled by tail fins at the aft end of the balloon envelope. These tail surfaces preferably include a rigid or stable portion which stabilizes the airship in horizontal flight, and a manipulable portion which changes the direction of flight. Vertically extending control surfaces are pivoted to the left or right to change the djirection of flight, and horizontally extending surfaces move up or down to cause the airship to ascend or descend. Primarily, the temperature of the hot air within the airship is controlled to provide sufficient lift for the weight of the envelope and the payload being carried so that essentially free lift is present while the airship is in flight, and it ascends or descends in accordance with the change in angle of the control tail surfaces. The tail surfaces primarily are arranged in a cruciform or X shape so that there are two horizontal extending surfaces and two vertical extending surfaces, but they may be also arranged in other forms such as the inverted Y shape.

Heretofore, the tail surfaces were made up of a fixed main surface and a controllable smaller surface at the aft end. The construction consisted primarily of lightweight metal structural beams covered with a doped fabric. These were held to the envelope by cables which distributed the load into fabric patches cemented to the envelope. The surfaces were made up of material constructed so that they could be light in weight, but when so constructed, were somewhat fragile and created a substantial strain on the fabric of the balloon envelope at the locations of attachment. Further, when the ballon envelope was deflated, the tail surfaces were bulky and awkward and care had to be taken so that they were not bent or damaged, and particularly care had to be taken in handling the envelope and tail so that the reinforcing patches were not torn out of the balloon envelope or the support for the tail surfaces were not damaged. The tail surfaces contributed nothing to lift and were a necessary nuisance insofar as handling and flight were concerned.

It is accordingly an object of the present invention to provide an inflatable propelled airship having improved tail surface construction avoiding disadvantages of rigid tail surfaces heretofore available.

A further object of the invention is to provide an improved pressurized tail surface construction for a hot air airship wherein the tail surfaces are automatically maintained at inflation pressure by constant communication with the interior of the balloon envelope.

A still further object of the invention is to provide a hot air pressurized airship with inflated tail surfaces and also inflated control surfaces which are hinged to the inflated surfaces by a unique hinge which itself is inflated and functions dually as a hinge and inflation communication means for the control surface.

A further advantage of a structure in accordance with the present invention which meets the objectives above set forth is that it can be easily constructed, can be rolled and handled fur storage and shipping without concern as to misalignment or damage to the tail surfaces, and these surfaces provide reliable control during flight and cannot be accidentally damaged by air gusts or obstacles that are encountered in the air on the ground.

Other objects, advantages and features, as well as equivalent structures which are intended to be covered herein, will become more apparent from the teaching of the principles of the invention in connection with the disclosure of the preferred embodiment in the specification, claims, and drawings in which:

DRAWINGS

FIG. 1 is a side elevational view of an airship having the features of the present invention;

FIG. 2 is a top plan view of the airship of FIG. 1 taken substantially along line II—II of FIG. 1;

FIG. 3 is an aft elevational view taken substantially along line III—III of FIG. 2;

FIG. 4 is an enlarged horizontal sectional view taken substantially along line IV—IV of FIG. 2;

FIG. 5 is a fragmentary plan view of tail sections of the airship taken substantially along line V—V of FIG. 2;

FIG. 6 is a sectional view taken substantially line VI—VI of FIG. 5 showing the internal construction of the hinge arrangement;

FIG. 7 is an internal fragmentary sectional view of a portion of the tail taken substantially along line VII—VII of FIG. 5; and FIG. 8 is an enlarged sectional view taken substantially along line VIII—VIII of FIG. 2.

DESCRIPTION

As shown in FIGS. 1 through 3, an airship includes an inflatable pressurized flexible gas envelope 10 which is elongate in shape and aerodynamically formed so as to be capable of horizontal flight. The envelope is formed of a suitable flexible fabric material such as a plastic impregnated or laminated nylon and may be formed of horizontally extending gores 11 seamed and cemented to each other and stitched in a circumferential direction for strength. Suspended beneath the airship envelope 10 is a gondola 12 which is supported by a series of spaced cables not shown in detail. The gondola is provided with controls and a space for occupants, and immediately above the gondola at location 12a is a pressure hot air inflation unit 12a which will include a fan and one or more burners. This will continually pressurize the envelope with air which is heated to a controlled degree to provide adequate lift for the envelope and payload.

At the top surface, as shown in FIG. 2, is a removable patch 13 which is normally maintained in place and will, of course, remain in place during flight but is provided for access to the balloon interior and for removal on the ground for rapid deflation.

At the aft end of the airship envelope 10 are a plurality of tail surfaces. The main stabilizing tail elements are nonmovable, and support movable guide surfaces at their aft ends as will be described in further detail. The upper and lower tail assemblies are shown at 14 and 15, and the lateral tail assemblies at 16 and 17. The upper forward nonmovable tail member is shown at 21. The side nonmovable tail members are shown at 18 and 19. The side movable tail members are shown at 23 and 24, and the lower movable tail member at 22. Control lines connect to the pivotal guide tail members 23, 24, 22 and 25, and these lines are shown generally at 26 and lead through small sealed openings 26a in the envelope to the gondola 12 so as to be controllable by the pilot of the airship. The movable tail surfaces, of course, are individually controllable so as to turn the airship to the left or right during horizontal flight or to angle it up or down during flight.

As a feature of the present invention, the stable tail members 18, 19 and 21 are pressurized and inflatable through hot air passages leading directly from the envelope. The movable guide tail members are also directly inflatable by the hot air from the envelope by having passages extending through the hinges which support the movable tail members. As shown in FIG. 2, the movable tail member 24 is supported by hinge 27, and the movable tail member 23 is supported by hinge 28. Movable tail member 25 is supported on a hinge 29. These hinges are unique in construction, and also function as inflation passages for the movable tail member as will be seen in further detail in FIGS. 4, 5 and 6.

In FIG. 4 the hinge 27 is shown as including a pair of parallel panels 31 and 32 spaced apart so as to form an air flow passage 30 therethrough. The nonmovable tail member 18 is inflated with heated gas from the envelope, and the heated gas flows through an opening 35 in the aft surface of the tail member 18, through the passage 30, and through an opening 36 in the forward edge of the movable tail member 24. Thus, the hinge 27, formed of the flexible panels 31 and 32 permits easy pivoting of the movable tail member 24, and yet permits it to remain pressurized at the same pressure as the interior of the airship, and permits deflation through the openings when the ship is to be deflated and stored.

The panels 31 and 32 are suitably strongly attached to the nonmovable tail section 18 and the movable tail section 24 by stitching such as shown at 33 and 34. Similar stitching is provided at 39 and 40 for a joining strip 39a, and another joining strip 40a which strips join the edges of the panels to complete the hinge. The opening 35 leading from the nonmovable tail members 18 is surrounded by a panel of material 35a which has cables 42 extending thereacross at spaced intervals to prevent spreading of the material at the sides of the opening 35. The construction of the various tail assemblies is the same so that each need not be described in detail, and the construction and various sides of the tail sections are similar so that the arrangement of each of the seaming structures will be apparent to those versed in the art from the drawing and the description given above.

As shown in FIGS. 5 through 8, the nonmovable tail sections, such as 18, are formed of side panels 43 and 44 angled outwardly at their lower edge where they attach to the balloon envelope and angled inwardly toward the outer edge so as to form a somewhat rigid pyramid shaped tail structure. The outer edges of the panels 43 and 44 are capped with a rounded fabric cap 45 aerodynamically shaped at its outer edge. The movable tail element is attached to the balloon envelope somewhat as shown in FIG. 8 by stitching forming seams, and plastic cement may be used in the seams for added reinforcement. Reinforcing cross-panels, such as 45 may be employed spaced apart in a fore and aft direction for additional reinforcement of the fins to aid them in maintaining their structural shape. Air flow holes 46 are formed in balloon envelope material 48, as illustrated in FIG. 5.

The movable tail elements, such as 24, shown in FIG. 5, will be formed of panels such as 50, 51, and 52 tailored by cutting and sewing so as to form an aerodynamic shape and additional cross reinforcing panels within the interior may be provided to aid in shape retention of the tail guide members. Reinforcing side patches may be employed at the location of attachment of the control cables or lines 26 illustrated in FIG. 3.

Thus, in operation of the outwardly tapered nonmovable tail sections such as 18, 19 and 21 will maintain their position relative to the envelope 10 and stabilize the balloon in horizontal flight as the air currents flow over the surfaces. These nonmovable tail surfaces will be relative rigid and can temporarily deflect with air gusts, but provide adequate and reliable guide surfaces. With their internal cross-reinforcement and their pyramid shape, they are capable of supporting the movable tail fins which are hinged to the aft ends of the rigid tail members, and the movable fins will retain their shape by virtue of inflation to the hollow hinges. The hinges formed of the parallel panels will tend to maintain the movable tail member centered, as will the air currents flowing past the movable tail fin surfaces after the currents flow past the nonmovable tail fin surfaces. However, small tilting of the movable tail fin members will steer the airship. When the airship is on the ground and is to be deflated, deflation of the envelope will automatically deflat the guide surfaces, and they can be completely collapsed and folded or rolled, and when they are reinflated, will reassume their correct operating position relative to the balloon envelope. The hinge forms a dual function in both supporting and permitting pivotal movement of the aft control tail fin sections and in forming pressurizing and inflating passages for the heated gas. There is no separate duct work needed to inflate the movable surface.

I claim as my invention;

1. A collapsible storable hot air airship comprising in combination;

a horizontally extending elongate aerodynamic shaped hot air envelope for forming an airship;

pressure hot air generating means carried on the envelope for pressurizing the envelope with heated air during flight;

a collapsible storable inflatable hollow first tail member at the aft end of the airship extending radially therefrom for stabilizing the flight of the airship and being in hot air communication with the interior of the hot air envelope to be inflated by the hot air within the envelope;

a collapsible storable hollow inflatable second tail member positioned at the aft end of the first tail member;

flexible hot air communication conduit having spaced parallel walls extending between said first tail member and said second tail member for inflating the second tail member from the hot air of the first tail member;

and pilot operated control means for changing the position of said second tail member relative to the envelope and the first tail member for controlling the direction and elevation of flight of the hot air envelope.

2. A hot air airship constructed in accordance with claim 1:
wherein said first and second tail members are formed of flexible fabric and the fabric of the first tail member is sewn to the envelope.

3. A hot air airship constructed in accordance with claim 1:
wherein said second tail member is joined to the first tail member by parallel fabric walls forming a hinge with gas passages between the walls to permit the flow of hot air from the first tail member to the second tail member.

4. A hot air airship constructed in accordance with claim 1:
wherein four of said first and second tail members are included as upper and lower vertically extending members for controlling the direction of flight of the airship and laterally extending side tail members for controlling the elevation of flight of the airship.

5. A hot air airship in accordance with claim 1 in which the flexible hot air conduit has support cables therein between the spaced parallel walls to prevent deformation of the air conduit.

* * * * *